United States Patent
Paton-Ash et al.

(10) Patent No.: US 8,506,681 B2
(45) Date of Patent: Aug. 13, 2013

(54) APPARATUS, SYSTEM AND METHOD FOR CLEANING AIR

(75) Inventors: Gregory Paton-Ash, Marietta, GA (US); Michael Bishoff, Friendsville, MD (US); Donald Beitzel, Grantsville, MD (US); John J. Reinmann, Jr., Alpharetta, GA (US)

(73) Assignee: Strata Products Worldwide, LLC, Sandy Springs, GA (US)

(*) Notice: Subject to any disclaimer, the term of this patent is extended or adjusted under 35 U.S.C. 154(b) by 312 days.

(21) Appl. No.: 12/075,002

(22) Filed: Mar. 7, 2008

(65) Prior Publication Data
US 2008/0216653 A1 Sep. 11, 2008

Related U.S. Application Data

(60) Provisional application No. 60/905,948, filed on Mar. 9, 2007.

(51) Int. Cl.
*B01D 53/02* (2006.01)

(52) U.S. Cl.
USPC ............ 95/139; 96/108; 96/151; 55/418; 55/420

(58) Field of Classification Search
USPC ......... 95/183, 273, 286; 123/198 E; 55/418, 55/420, 385.3, 482, 484, 523; 422/177; 96/108, 151, 139
See application file for complete search history.

(56) References Cited

U.S. PATENT DOCUMENTS

| | | | | |
|---|---|---|---|---|
| 2,284,964 A | * | 6/1942 | Mautz et al. | 128/205.12 |
| 2,325,049 A | * | 7/1943 | Frye et al. | 128/204.17 |
| 3,261,659 A | | 7/1966 | Schwichtenberg et al. | |
| 3,393,479 A | | 7/1968 | Slotnick | |

(Continued)

FOREIGN PATENT DOCUMENTS

| DE | 3538135 A1 | 4/1987 |
|---|---|---|
| EP | 0050243 B1 | 4/1982 |

(Continued)

OTHER PUBLICATIONS

Strata Products (USA), Inc., "Carbon Dioxide Scrubber," Advertisement, (Mar. 2006).

*Primary Examiner* — Robert A Hopkins
(74) *Attorney, Agent, or Firm* — Ansel M. Schwartz

(57) ABSTRACT

An apparatus for cleaning air includes a housing having a chamber. The scrubber includes a carbon dioxide scrubber layer disposed in the chamber which claims carbon dioxide from air passing through the scrubber layer. The scrubber includes a forcing element which draws the air into the scrubber and forces the air through the scrubber layer which is powered without any electricity. A system for supporting a breathable environment for users. The system includes an enclosure. The system includes an air scrubber disposed in the enclosure which cleans carbon dioxide from air in the enclosure that is powered without any electricity. A method for cleaning carbon dioxide from air. The method includes the steps of flowing compressed air through a fluid driven motor to operate the motor without any electricity. There is the step of rotating a fan with the operating motor. There is the step of drawing air into a chamber of a housing with the fan blowing the air through a carbon dioxide scrubber layer of soda lime in the chamber, which scrubs the air of carbon dioxide, and out through an opening in the chamber above the layer. A cartridge for a scrubber.

29 Claims, 11 Drawing Sheets

(56) References Cited

U.S. PATENT DOCUMENTS

| | | | |
|---|---|---|---|
| 4,096,702 A | | 6/1978 | Burton |
| 4,325,364 A | * | 4/1982 | Evans ................ 128/201.13 |
| 4,451,435 A | | 5/1984 | Holter et al. |
| 4,632,678 A | | 12/1986 | Cosyns et al. |
| 4,708,053 A | | 11/1987 | Forsythe et al. |
| 5,082,471 A | * | 1/1992 | Athayde et al. ................ 95/51 |
| 5,411,046 A | | 5/1995 | Wan |
| 5,487,380 A | * | 1/1996 | Grabenkort ............ 128/204.15 |
| 5,537,784 A | | 7/1996 | Baldwin |
| 5,595,949 A | | 1/1997 | Goldstein et al. |
| 5,706,846 A | | 1/1998 | Sutton |
| 5,862,819 A | | 1/1999 | Cradeur |
| 6,699,309 B1 | | 3/2004 | Worthington, II et al. |
| 6,712,071 B1 | * | 3/2004 | Parker ................ 128/204.21 |
| 7,533,942 B2 | * | 5/2009 | Kennedy et al. ................ 299/12 |
| 2002/0061270 A1 | | 5/2002 | Osborne |
| 2006/0278216 A1 | | 12/2006 | Gagas et al. |
| 2007/0199244 A1 | | 8/2007 | Kennedy et al. |
| 2007/0202796 A1 | | 8/2007 | Kennedy et al. |
| 2008/0106137 A1 | | 5/2008 | Paton-Ash et al. |

FOREIGN PATENT DOCUMENTS

| | | |
|---|---|---|
| EP | 0182581 A3 | 5/1986 |
| EP | 0230875 A1 | 8/1987 |
| GB | 515442 A | 12/1939 |
| GB | 2043737 A | 10/1980 |
| GB | 2420507 A | 5/2006 |
| JP | 57187017 A | 11/1982 |
| KR | 2004-058590 D1 | 7/2004 |
| RU | 2158148 C1 | 10/2000 |
| SU | 955990 D2 | 2/1981 |
| WO | WO 00/16878 A2 | 3/2000 |
| WO | WO 2005/052319 A1 | 6/2005 |
| WO | WO 2005/086613 A2 | 9/2005 |
| WO | WO 2007/030783 A3 | 3/2007 |
| WO | WO 2007/112482 A1 | 10/2007 |
| WO | WO 2007/117266 A3 | 10/2007 |

\* cited by examiner

FAN 20

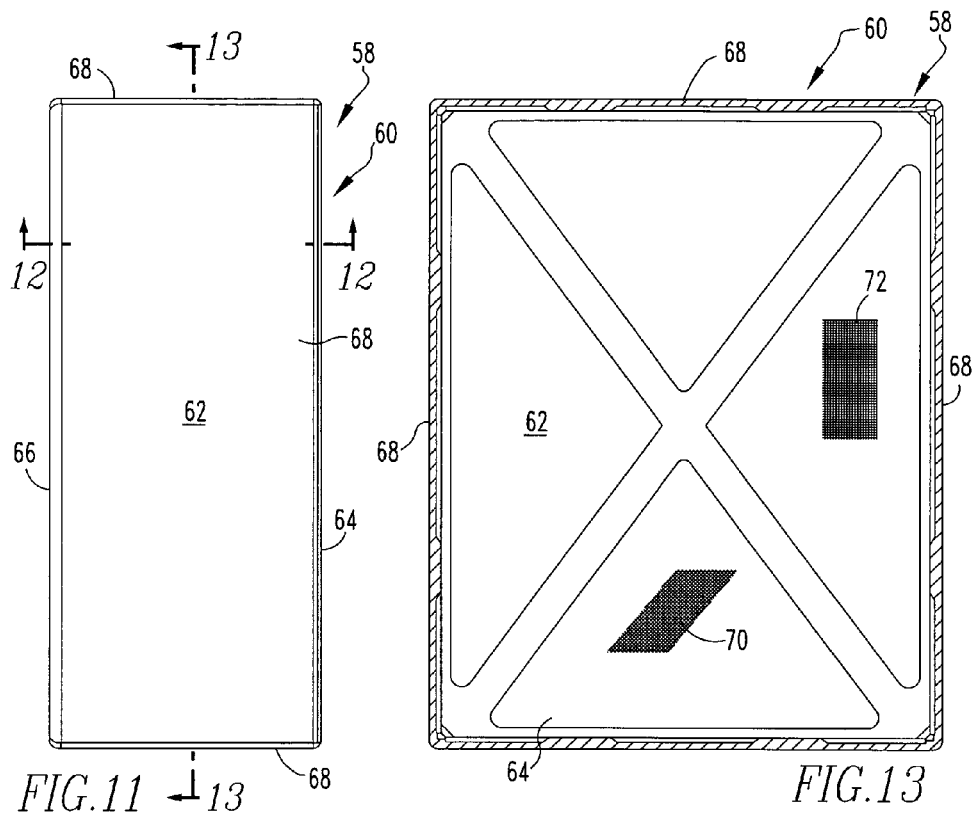
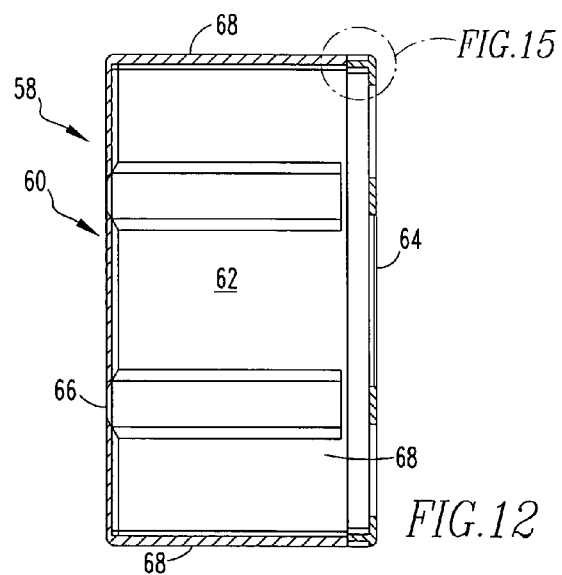

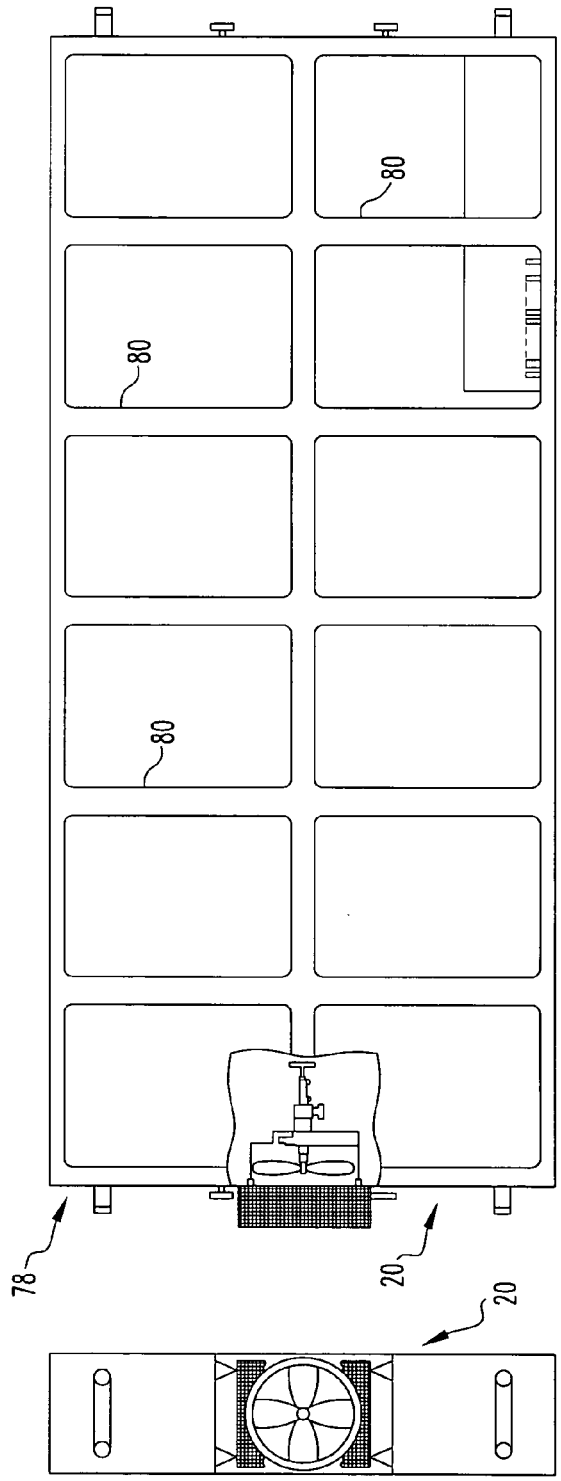
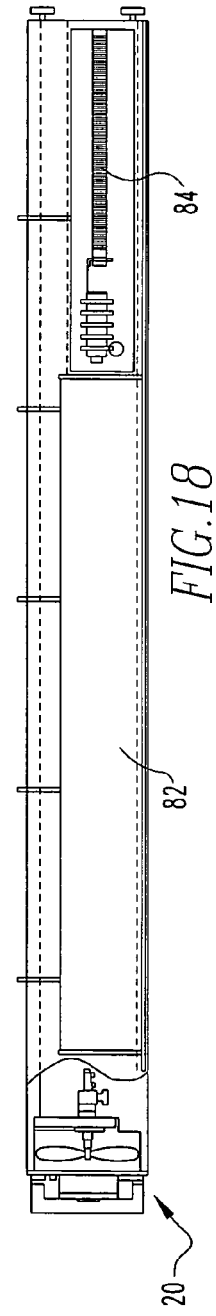
FIG.16
FIG.17
FIG.18

APPARATUS, SYSTEM AND METHOD FOR CLEANING AIR

FIELD OF THE INVENTION

The present invention is related to the scrubbing of carbon dioxide from air without any electricity to maintain a safe and breathable environment in an enclosure for users. More specifically, the present invention is related the scrubbing of carbon dioxide from air without any electricity to maintain a safe and breathable environment in an enclosure for users using only compressed air and oxygen to power a motor to run a fan that draws air through a chamber where it is scrubbed of carbon dioxide and where the compressed air and oxygen are then further used to support the environment.

BACKGROUND OF THE INVENTION

As is well known, trees and plants through the process of photosynthesis naturally convert $CO_2$ into oxygen. When nature cannot do its job, chemistry takes over. In manned, enclosed atmospheres such as rescue chambers, dive devices or submarines, two chemical technologies have historically been employed to scrub the $CO_2$ from the environment: lithium hydroxide and soda lime. Below are the pros and cons of both materials.

|  | Soda Lime w/ Scrubber | Lithium Hydroxide Curtains |
|---|---|---|
| $CO_2$ Absorption: | 150 liters $CO_2$ per kg | 402 liters $CO_2$ per kg |
| Packaging: | 20 kg (44 lb) sealed kegs | 8 curtains per box; 5.72 lbs of LiOH per box. |
| 96 Hr Requirements: | 1 keg per man | 2.75 boxes per man Per MSHA: (.244 lbs/man-hr) * 96 hr/ 5.72 lbs/box = 4.1 boxes |
| Approx Cost/unit: | $135/keg | $487/box |
| Cost/man for 96 hrs: | $135/man | $1339/man $1997/man per MSHA |
| Shelf Life: | 5 years | 5 years; must be discarded |
| Heat Generated: | 32 Btu's per man per hour | 130 Btu's per man per hour; curtains actually hot to the touch |
| Deployment: | Simple; new keg added when color changes | Complicated; curtains must be hung at a set schedule and spacing |
| Effectiveness: | good air circulation from Air driven fan | only works in small, confined areas; not effective in large areas |
| Power Requirements: | None; air/oxygen driven fan | None; passive system relies on localized natural convective currents |

BRIEF SUMMARY OF THE INVENTION

The present invention pertains to an apparatus for cleaning air. The apparatus comprises a housing having a chamber. The scrubber comprises a carbon dioxide scrubber layer disposed in the chamber which claims carbon dioxide from air passing through the scrubber layer. The apparatus comprises a forcing element which draws the air into the scrubber and forces the air through the scrubber layer which is powered without any electricity.

The present invention pertains to a system for supporting a breathable environment for users. The system comprises an enclosure. The system comprises an air scrubber disposed in the enclosure which cleans carbon dioxide from air in the enclosure that is powered without any electricity.

The present invention pertains to a method for cleaning carbon dioxide from air. The method comprises the steps of flowing compressed air through a fluid driven motor to operate the motor without any electricity. There is the step of rotating a fan with the operating motor. There is the step of drawing air into a chamber of a housing with the fan blowing the air through a carbon dioxide scrubber layer of soda lime in the chamber, which scrubs the air of carbon dioxide, and out through an opening in the chamber above the layer.

The present invention is a cartridge for a scrubber. The cartridge comprises a cartridge housing having a cartridge chamber and a porous top and opposing porous bottom. The cartridge comprises soda lime disposed in and filling the cartridge chamber.

The present invention pertains to a method for scrubbing air. The method comprises the steps of activating a fan inside a refuge cartridge chamber. There is the step of drawing air in the refuge cartridge chamber through soda lime in a cartridge with the fan.

BRIEF DESCRIPTION OF THE SEVERAL VIEWS OF THE DRAWING

In the accompanying drawings, the preferred embodiment of the invention and preferred methods of practicing the invention are illustrated in which:

FIG. 7 shows a perspective view of the apparatus.

FIG. 11 is a side view of a cartridge of the present invention.

FIG. 12 is an overhead sectional view of the cartridge.

FIG. 13 is a side sectional view of the cartridge.

FIG. 16 is an overhead view of a table of the present invention.

FIG. 17 is a front view of the table.

FIG. 18 is a side sectional view of the table.

DETAILED DESCRIPTION OF THE INVENTION

Figure 3:
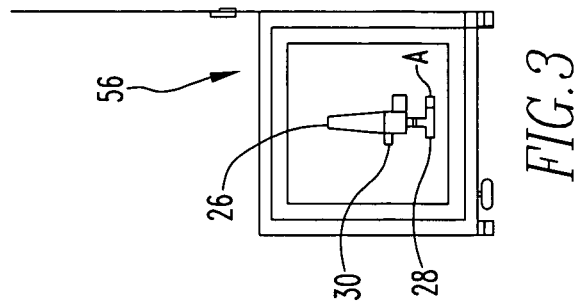
FIG. 3 is a rear sectional view of the present invention.
Figure 2:
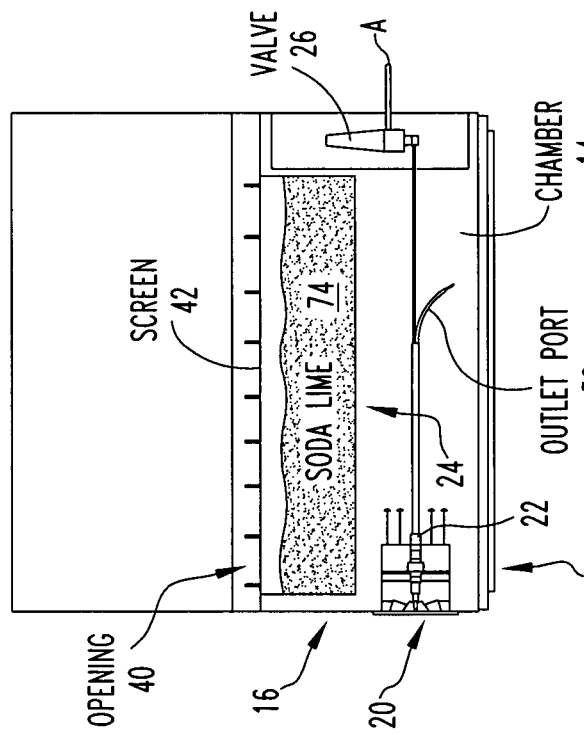
FIG. 2 is a side sectional view of the apparatus.
Figure 1:
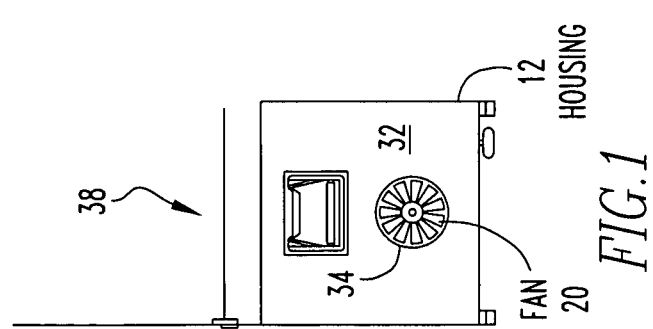
FIG. 1 is a front view of the apparatus of the present invention.

Referring now to the drawings wherein like reference numerals refer to similar or identical parts throughout the several views, and more specifically to FIGS. 1-3 and 7-9 thereof, there is shown an apparatus 10 for cleaning air. The apparatus 10, otherwise called an air scrubber 56, comprises a housing 12 having a chamber 14. The scrubber 56 comprises a carbon dioxide scrubber layer 16 disposed in the chamber 14 which cleans carbon dioxide from air passing through the scrubber layer 16. The scrubber 56 comprises a forcing element 18 which draws the air into the scrubber 56 and forces the air through the scrubber layer 16 which is powered without any electricity.

Figure 5:
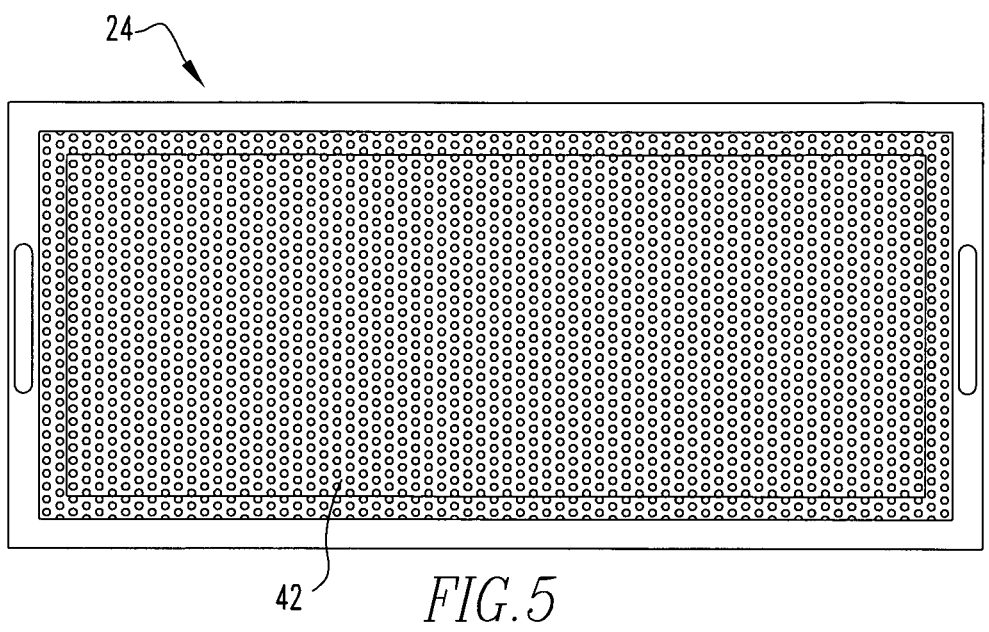
FIG. 5 shows a side view of the platform.
Figure 4:
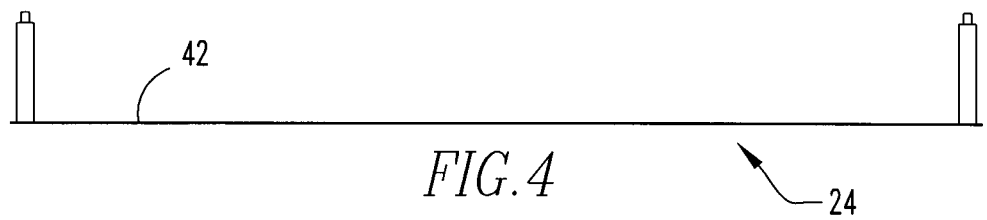
FIG. 4 shows a top view of the table.
Figure 6:
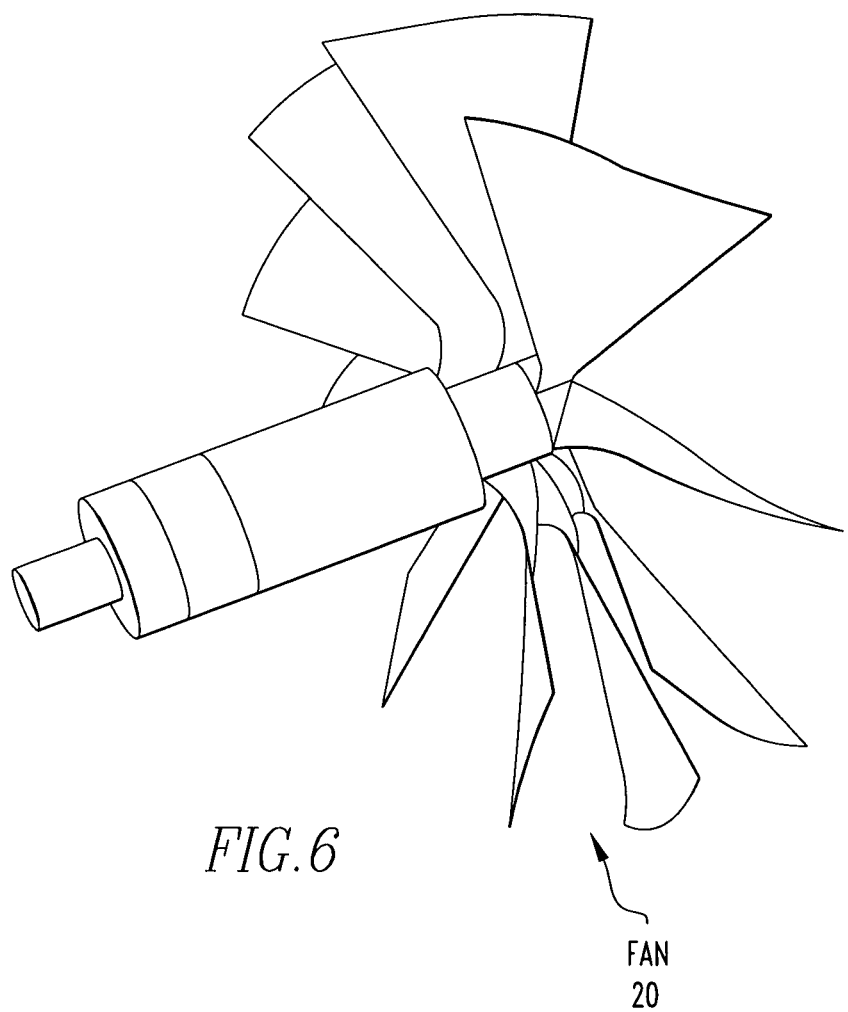
FIG. 6 shows a fan.

Preferably, the forcing element 18 includes a fan 20, as shown in FIG. 6. The forcing element 18 preferably includes a fluid powered motor 22 mechanically engaged with the fan 20 to operate the fan 20 which draws the air into the chamber 14 and forces the air through the layer. Preferably, the scrubber layer 16 includes soda lime 74 and a platform 24 disposed in the chamber 14 upon which the soda lime 74 is disposed, as shown in FIGS. 4 and 5. The forcing element 18 preferably includes a valve 26 in fluid connection with the motor 22 through which fluid is provided to the motor 22 to operate the motor 22.

Preferably, the valve 26 includes a compressed air port 28 which receives a flow of compressed air. The valve 26 preferably includes a compressed oxygen port 30 which receives a flow of compressed oxygen, the valve 26 combining the compressed air flow and the compressed oxygen flow and directing it to the motor 22. Preferably, the valve 26 is adjustable to control the flow of compressed oxygen. The valve 26 preferably uses only fluid to operate.

Preferably, the fan 20 is attached to a side wall 32 of the housing 12 at a hole 34 in the side wall 32. The motor 22 preferably has an outlet port 36 through which the compressed air and compressed oxygen flows into the chamber 14 after flowing through the motor 22 to operate the motor 22. Preferably, the housing 12 has a top 38 with an opening 40 through which the air that has passed through the layer flows out of the housing 12. The opening 40 of the housing 12 preferably has a screen 42.

Figure 8:
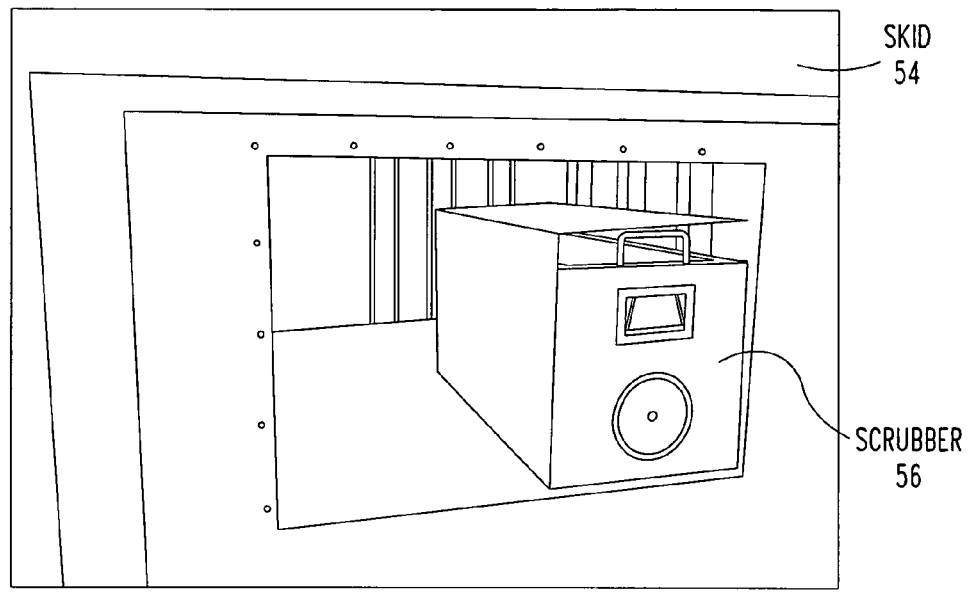
FIG. 8 shows the apparatus in a skid.
Figure 9:
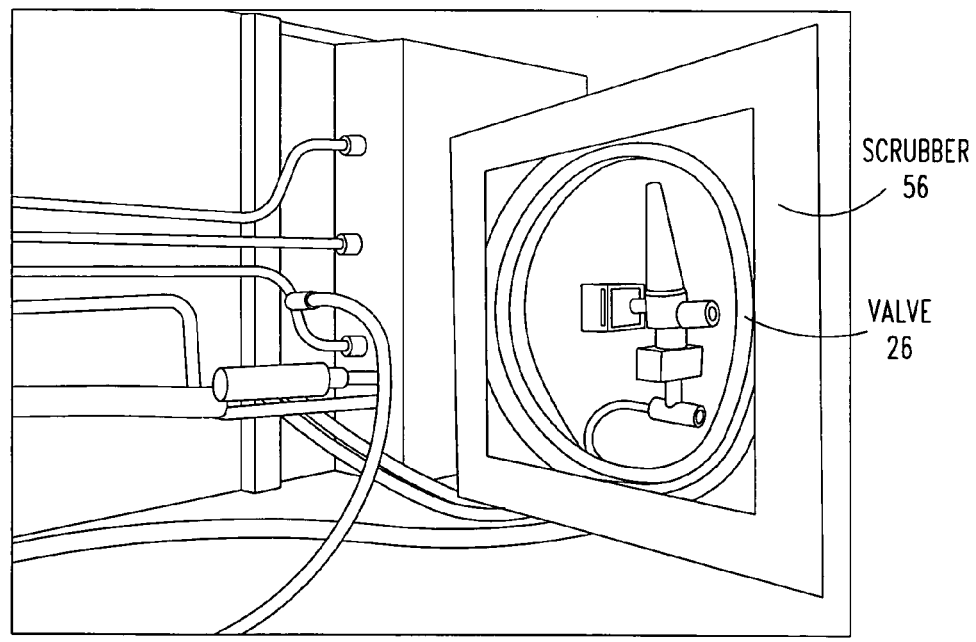
FIG. 9 shows a valve attached to the housing.
Figure 10:
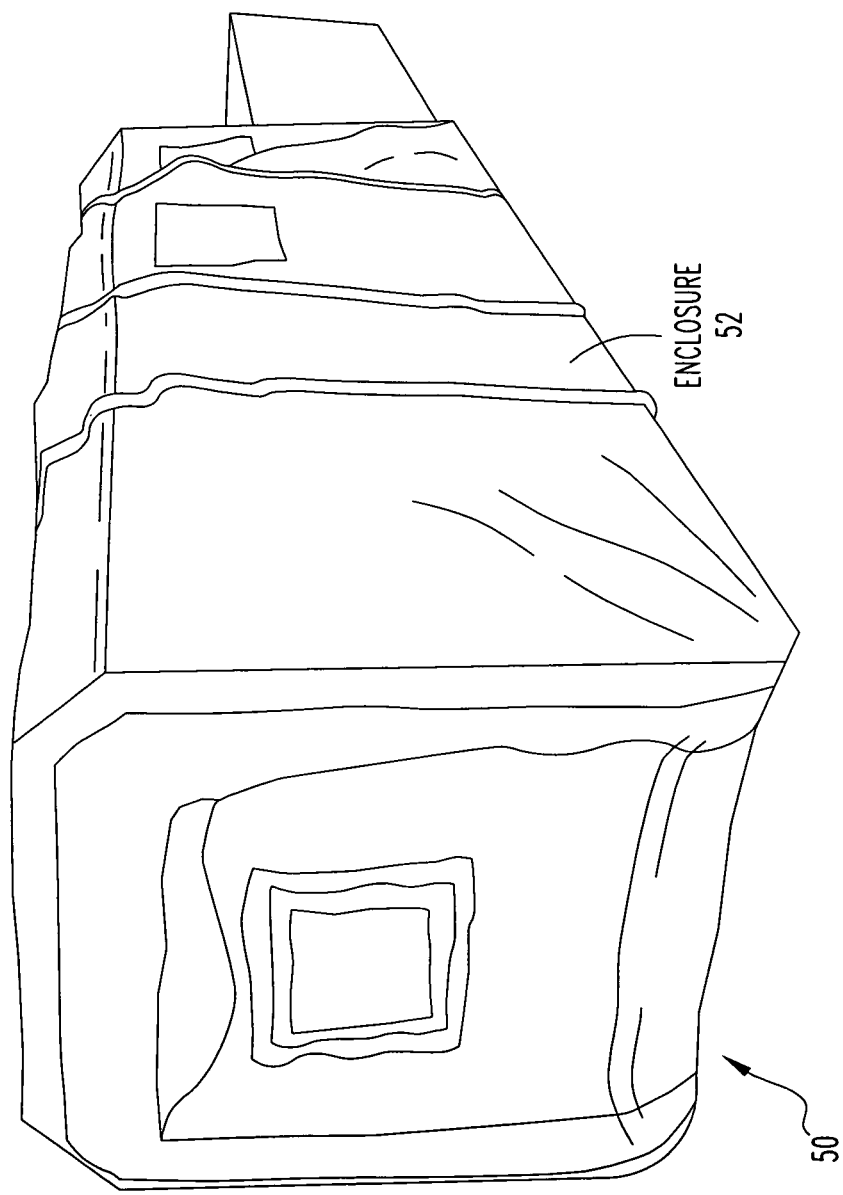
FIG. 10 shows a perspective view of an enclosure.
Figure 14:
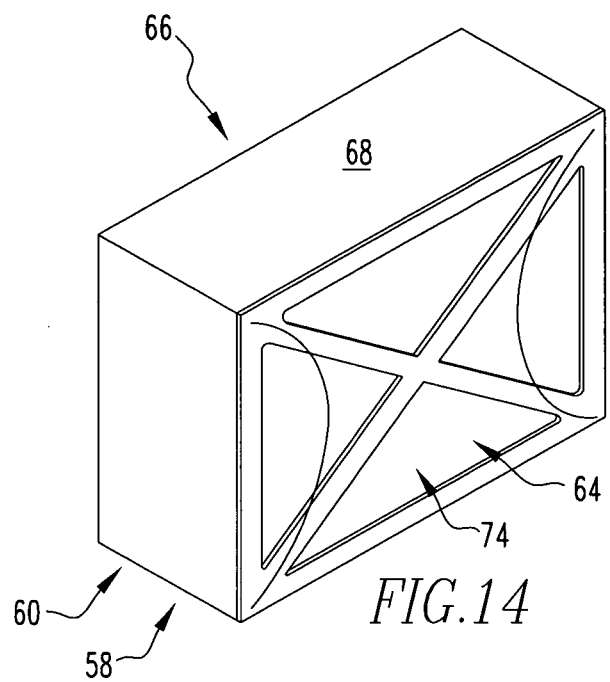
FIG. 14 is a perspective view of the cartridge.
Figure 15:
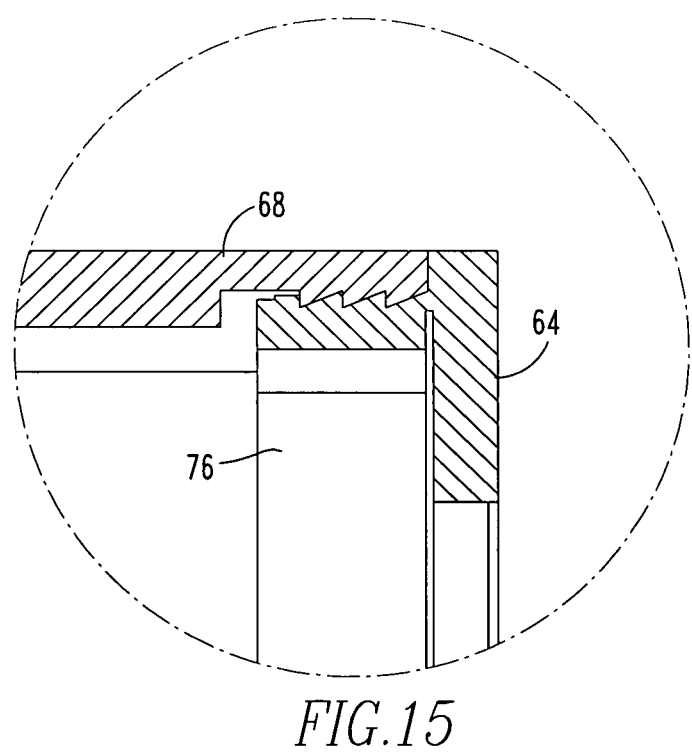
FIG. 15 is a sectional view of a corner of the cartridge.

The present invention pertains to a system 50 for supporting a breathable environment for users. The system 50 comprises an enclosure 52, as shown in FIGS. 8-10. The system 50 comprises an air scrubber 56 disposed in the enclosure 52 which cleans carbon dioxide from air in the enclosure 52 that is powered without any electricity.

The present invention pertains to a method for cleaning carbon dioxide from air. The method comprises the steps of flowing compressed air through a fluid driven motor 22 to operate the motor 22 without any electricity. There is the step of rotating a fan 20 with the operating motor 22. There is the step of drawing air into a chamber 14 of a housing 12 with the fan 20 blowing the air through a carbon dioxide scrubber layer 16 of soda lime 74 in the chamber 14, which scrubs the air of carbon dioxide, and out through an opening 40 in the chamber 14 above the layer.

Preferably, the flowing step includes the step of flowing compressed air and compressed oxygen. There is preferably the step of flowing the compressed air and compressed oxygen into the chamber 14 after it flows through the motor 22 to operate the motor 22. Preferably, the flowing step includes the step of connecting a compressed air tank to a compressed air line connected to a valve 26 connected to the motor 22.

The flowing step preferably includes the step of connecting a compressed oxygen tank to a compressed oxygen line connected to the valve 26 connected to a gas line to the motor 22. Preferably, the flowing step includes the step of combining the compressed air from the compressed air line and the compressed oxygen from the compressed oxygen line together with the valve 26 and providing the compressed air and the compressed oxygen together to the motor 22. There is preferably the step of placing the housing 12 into an enclosure 52.

The enclosure 52 can be inside a mine where a hazardous environment has presented itself, or in a hazardous environment generally where a safe refuge is needed for a prolonged period of time, until the hazardous environment abates or rescue can occur of the users in the enclosure 52. See U.S. patent application Ser. No. 11/903,079 titled "Refuge Chamber and Method," incorporated by reference herein, for a description of an enclosure and skid 54 which holds compressed air and compressed oxygen tanks and the air scrubber 56.

The compressed air and compressed oxygen turns the fan 20 motor 22 and then the compressed air and oxygen releases into the scrubber 56 chamber 14 through a return line from the motor 22. In terms of structural design, there is a valve 26 connecting lines from a compressed air tank and an oxygen tank which joins the two lines and together feeds the flow from both in one line to the fan 20 motor 22. The compressed air at a flow rate of 0.16 cfm is supplemented with the flow of oxygen to increase the speed of the fan 20. Oxygen is metered into the chamber 14 at 30 liters per person per hour, so the more people you have, the higher the flow rate and the faster the fan 20 turns, giving more air flow and better circulation in the chamber 14. This is one of the novel designs in the scrubber 56.

The fan 20 runs causing air outside the scrubber 56 to be drawn into the scrubber 56 where the continued action of the scrubber 56 blowing air and forces the air blown into the scrubber 56 to flow up through the soda lime 74 layer which scrubs the carbon dioxide and releases clean air. The soda lime 74 is a carbon dioxide absorbent. The compressed air and oxygen is released into the scrubber 56 chamber 14 and is blown through the lime 74 layer with the air from outside the scrubber 56 by the action of the fan 20.

The Air-Driven Carbon Dioxide Scrubber 56 operates in the following manner.

The air powered soda lime 74 carbon dioxide Scrubber 56 operates using compressed air as opposed to batteries. The compressed air powers a motor 22 which drives a fan 20. The fan 20 then facilitates the flow of air through the scrubbing system 50.

The system 50 has an oxygen manifold that connects to a bank of oxygen cylinders. The system 50 has a flow meter so that oxygen can be metered into the room/chamber 14 to replenish oxygen consumed by occupants. The flow rate is set based on the number of occupants.

DETAILED SPECIFICATIONS OF A PREFERRED EMBODIMENT

48/96 hr Air-driven motor carbon dioxide Scrubbing system 50
a. Brief description:
  The carbon dioxide Scrubber 56 is a self contained system 50 designed to provide oxygen at controlled rates and remove carbon dioxide from the air in enclosed areas. It utilizes T or HC4500-size oxygen cylinders to provide oxygen and four or eight (4/8) 6000 psi compressed air cylinders to power a motor 22 that drives a fan 20. The fan 20 facilitates the movement of air through the scrubber 56 to achieve successful scrubbing.
b. Specifications:
Housing:
Made from fully welded, powder coated steel or fiber glass outer and chemical tray.
Unit Air Supply:
48/96 hour Air-Driven Motor carbon dioxide scrubber unit.
  The number of oxygen cylinders required depends on the number of occupants in the enclosure chamber.
Operation:
Compressed air powers a small motor 22 which drives a fan 20 in the system 50. The fan 20 rotates to draw air from the enclosure chamber into the scrubber 56 and up through the tray of soda lime 74 chemicals. This scrubs the carbon dioxide out of the air.

Back-up System: Soda Lime 74 should be spread out on the floor.

Size:

16" Wide×22" Deep×18" High

Operation:

It requires activation by turning the valve 26 to start the flow of compressed air and placing the chemicals in the tray.

Maintenance:

It is recommended that monthly checks of the system 50 be performed to ensure proper function. The oxygen/compressed air cylinders must also be checked for correct volume of contents.

Added Benefit:

Additional flow of 15 cubic feet per hour will exhaust and reduce humidity and heat in the enclosure chamber The fan 20 assembly is comprised of the following parts:

| | |
|---|---|
| Fan: | McMASTER-CARR 17545K65 |
| Air Motor: | LYNX™ Pro-5 Low Speed Handpiece |
| 4-Hole Handpiece Tubing: | DCI #401C | c. Materials:
 i. Soda Lime Chemicals
d. Soda Lime Chemicals:
 i. Requirements: (44 lb kegs)

| 15-Man 48 hrs | 15-Man 96 hours |
|---|---|
| 10 | 20 |

Active scrubbing (as opposed to a passive curtain with lithium Hydroxide or Soda Lime) has significant advantages Air flow Circulation and no dead spots in the room/area being scrubbed Draws air through the soda lime 74 bed in the scrubber Allows reduced size Carbon Dioxide ($CO_2$) Scrubbing Carbon dioxide ($CO_2$) makes up 4-6% of the air that humans exhale. The amount of $CO_2$ varies from man-to-man based on the level of effort and/or stress.

The West Virginia Task Force specifications do not specify a rate of $CO_2$ production per man to use; however, the MSHA PIB P07-03 includes a rate of 1.08 cubic feet per hour per person (30.6 liters/hour-man) in their example calculations. 30 liters/hour per man have been used in all calculations here.

The West Virginia Task Force specifications limit $CO_2$ concentrations to no greater than 5000 parts per million or 0.5%. The MSHA PIB defines unacceptable air to contain over 3% $CO_2$ or 30,000 ppm. A 0.5% limit has been used in all calculations.

In another embodiment, there is an optional soda lime filled cartridge 58 scrubber in addition to the soda lime 74 tray filled with bulk soda lime 74. The present invention is a cartridge 58 for a scrubber 56, as shown in FIGS. 11-15. The cartridge 58 comprises a cartridge housing 60 having a cartridge chamber 62 and a porous cartridge top 64 and opposing porous bottom 66. The cartridge 58 comprises soda lime 74 disposed in and filling the cartridge chamber 62.

Preferably, the cartridge top 64 and bottom 66 each include a rigid mesh layer 70. The cartridge top 64 and bottom 66 sides 68 each preferably have a porous containment layer 72 adjacent the mesh layer 70 which contains the soda lime 74. Preferably, the cartridge housing 60 includes sides 68 in con-

| Oxygen | Air |
|---|---|
| Occupants = 20 | Inflate (Cu-Ft) = 928 |
| Hours = 96 | Purge (Cu-Ft)/per = 220 |
| Oxy rate p/person CFM = 0.0177 | # of Purges (x) = 4 |
| Oxy req'd @ full cap. (CFM) = 0.3532 | Total Purge (Cu-Ft) = 880 |
| Oxy Vol. req'd @ full cap. (Cu-Ft) = 2034.4 | |

Use HC-4500 Bottle Oxygen and supplemental C/A combo to run fan
(Fan flow rate @ .16-.51 CFM, depending on occupancy.)

96 hrs

| | | Oxygen HC-4500 @ 4500 psi | | | | | Compressed Air @ 6000 psi | | | | | | |
|---|---|---|---|---|---|---|---|---|---|---|---|---|---|
| | | Usage CFM | Bot. Cap. | Req. | % + | Total | Bottles | Usage CFM | Bot. Cap. | Req. | % + | Total | Bottles |
| Bottles | Oxygen | 0.353 | 500 | 4.07 | 1.25 | 5.09 | 5.00 | — | — | — | — | — | — |
| | Fan | SHARE | — | — | — | — | 0 | 0.16 | 509 | 1.81 | 1.1 | 1.99 | 2.00 |
| | Inflate | 0 | — | — | — | — | 0 | N/A | 509 | 1.82 | 1 | 1.82 | 2.00 | Bottle |
| | Purge | 0 | — | — | — | — | 0 | N/A | 509 | 1.73 | 1 | 1.73 | 2.00 | Total |
| | Totals | | | | | 5 | | | | | | 6 | 11 |

Novel Design Aspects

No external power source—All active scrubbers normally use electric or battery power.

De facto intrinsically safe—no electric connection or sparks

Use of Oxygen and Compressed air saves on use of Compressed air bottles and therefore reduces space in the skid 54 tact with the cartridge top 64 and bottom 66. At least either one of the sides 68, the cartridge top 64 or the bottom 66 is preferably removable. Preferably, the cartridge top 64 and bottom 66 have a lip 76. The soda lime 74 is preferably packed in the cartridge chamber 62 so channels for air to pass preferentially through the soda lime 74.

The present invention pertains to a method for scrubbing air. The method comprises the steps of activating a fan 20 inside a refuge cartridge chamber 62. There is the step of drawing air in the refuge cartridge chamber 62 through soda lime 74 in a cartridge 58 with the fan 20.

The total cartridge 58 cross-sectional area, exposed to the flow of the air to be scrubbed, is the same as the cross-sectional area of the tray design. Multiple cartridges 58 can be used to come up with the total cross-sectional area. For example, a 36 man scrubber utilizes twelve cartridges with a nominal dimension of 12" wide×16" long by 6" high. The height of the cartridges matches the depth of the soda lime 74 in the tray design and is determined by the minimum desired residence time of the air as it passes through the bed. The total cross-sectional area of the tray/cartridges 58 is determined by the available pressure drop provided by the fan 20 drawing air through the bed. The fan 20 motor 22 is driven by an air/oxygen source at a certain available flow rate determined by the required flow rate of oxygen for the number of people in the chamber 14. The fan 20 blade was selected based on the available RPM's of the motor 22, the desired flow rate of air through the scrubber 56 bed and the pressure drop across the scrubber 56 tray/cartridge bed. The desired flow rate of the air to be scrubbed is a function of the required level of $CO_2$ removal, the number of people and the assumed scrubbing efficiency per pass through the scrubber 56. Assume a 100% scrubbing efficiency per pass and a desired CO2 level of 5000 ppm or 0.5% CO2 in air.

The cartridge 58 is a box with a porous cartridge top 64 and bottom 66 and solid sides 68. The sides 68 can be made of sheet metal or plastic. The cartridge top 64 and bottom 66 is an open, expanded metal mesh that allows the most air to flow with the least amount of pressure drop while also being strong enough to support the full weight of the contents of the cartridge 58. Affixed to the inside surfaces of the cartridge top 64 and bottom 66 expanded metal is a fabric material that keeps the small particles from passing through the expanded metal. This fabric also allows the air to pass easily but keep the fine dust from entering the chamber 14 environment. The cartridges 58 also have removable sides 68 or tops to allow the soda lime 74 to be poured onto the rescue chamber 14 floor. This would be necessary in an emergency if the primary and secondary scrubber motors 22 both failed. While not as effective, the bulk soda lime 74 would continue to absorb $CO_2$ from the environment.

The solid sides 68 of the cartridge 58 are made of a non-permeable material. In one embodiment, the sides 68 are made of a 20 gauge, carbon steel sheet metal formed into a u-shape that creates three sides 68. The fourth side is removable to allow for filling the cartridge 58 with the soda lime 74. This side can be attached with screws or rivets or some mechanical means strong enough to hold the weight of the fill material. In another embodiment, an injection molded plastic is formed in a single piece. To avoid any chemical reactions, galvanized steel or unpainted steel is not used. Stainless steel, painted steel or plastic is preferred.

The expanded metal mesh (containment layer 72) attached to the cartridge top 64 and bottom 66 is an 18 gauge (0.048" thick) flattened expanded steel 2×½" No. 18F with a minimum clear opening of 70%. Again, the material selected can be painted steel, stainless steel or plastic. Stainless steel mesh can be molded into the plastic box to form the cartridge top 64 and bottom 66.

The scrim material is attached per the instructions herein. The scrim is a non-woven nylon fabric 1 oz per square yard weight with a very low pressure drop. At 0.5 inches of water, the scrim allows 734 cfm of air to pass. The scrim material is supplied by CEREX called PNB-II.

The particle size distribution and particle shape are critical. A 4 to 8 mesh is used to give non-spherical shaped particles. A material supplied by WR Grace called Sodasorb HMED 4-8 is used. The material fills the entire cartridge 58 so that channels do not form that allow the air to pass preferentially. It is also critical to avoid channeling along the smooth interface between the walls of the box and the fill material. A lip 76 (approx ½ inch wide) on the cartridge top 64 and bottom 66 perimeter of the steel and plastic boxes is used to reduce any short circuiting of the air along the vertical walls of the box. Ribs or sponge-like gasket material could also be used.

The packed density of the material is 40 lbs per 0.68 cubic feet or 58 lbs/cubic foot. To achieve this density, the material (or the box itself) has to be vibrated during the filling process. If the material is packed too densely, the air flow will be restricted and the pressure drop will increase. If the material is too loosely packed, it will eventually settle during shipping and handling thereby allowing the undesirable channels to form which allow air to pass.

The current scrubber 56 sizes are as follows.

| Number of People | Scrubber Size (Area open to flow ft$^2$) |
| --- | --- |
| 6 | 3.96 |
| 16 | 7.92 |
| 20 | 10.6 |
| 24 | 10.6 |
| 26 | 11.88 |
| 30 | 13.2 |
| 36 | 15.84 |

As shown in FIGS. 16-18, the cartridges 58 are placed on a table 78 having ridges 80 that define holding zones for the cartridges 58 so the cartridges 58 stay securely seated in place. When in place on the table 78, the cartridges 58 basically abut each other to form an essentially complete soda lime 74 layer where the path of least resistance for air flow is through the soda lime 74 in the cartridges 58. The fan 20 is attached to the table 78, under the table 78, so the fan 20 draws air downward through the soda lime 74 in the cartridges 58. The table 78 has a closed alley 82 with an air zone under the table 78 to which the fan 20 is in fluidic communication. The fan 20 can only draw air from the alley 82, so a flow path is created through the cartridges 58 into the alley 82 and out through the fan 20 into the refuge chamber 14 with the air now scrubbed. Tubing 84 extends through the alley 82 to supply pressurized air or oxygen to the fan 20 to power the fan 20.

Procedure for Making Cartridge

Refer to FIGS. 19-26.

Procedure for Inserting Scrim, Otherwise Known as the Containment Layer 72

1. Measure and cut two pieces of scrim to cover expanded metal mesh layer 70.
2. Use a spray adhesive on the inside of the box at the corners about one inch in width, making sure not to get any adhesive onto the expanded metal, and let dry for one minute.
3. While the adhesive is drying, use a piece of cardboard to lie on top of the scrim and fold the scrim over top of the cardboard.
4. Lay the cartridge flat with the expanded metal facing down.
5. Insert the scrim and unfold to fit approximately one inch all the way around the cartridge onto the adhesive, making sure a bond is made when the scrim contacts the adhesive.

6. Flip the cartridge over and repeat.

Procedure for Packing Soda Lime

7. When you have both pieces of scrim bonded inside the cartridge, fill the cartridge approximately half full of soda lime 74.
8. Compact soda lime. Test cartridges were settled using a "dead blow" hammer firmly moving from the bottom of the cartridge to the top on each side.
9. Further compact by tapping loaded cartridge on a hard, rigid surface, such as a concrete pad/floor.
10. Re-fill the cartridge to the top with soda lime and repeat steps eight through nine two or three times to ensure packing.
11. Level the soda lime at the top of the cartridge, and fold scrim over the soda lime tucking the scrim under the lip 76 for the bolt holes.
12. Place lid on top of cartridge making sure to insert the lip 76 of the lid over the expanded metal and thread the lid bolts into the holes.

Procedure for Emptying of Cartridge

13. Remove the cartridge lid and unfold one end of the scrim to make an opening 40.
14. Pour used soda lime, while holding the folded side of the scrim, into a designated container.

Figure 19:
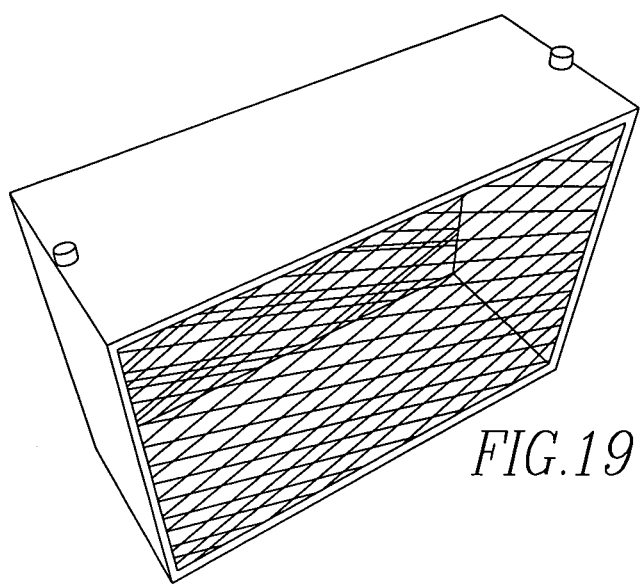
FIGS. 19-26 show the progression of steps of the production of the cartridge.

In terms of FIGS. 19-26:

FIG. 19 shows the empty metal cartridge.

Figure 20:
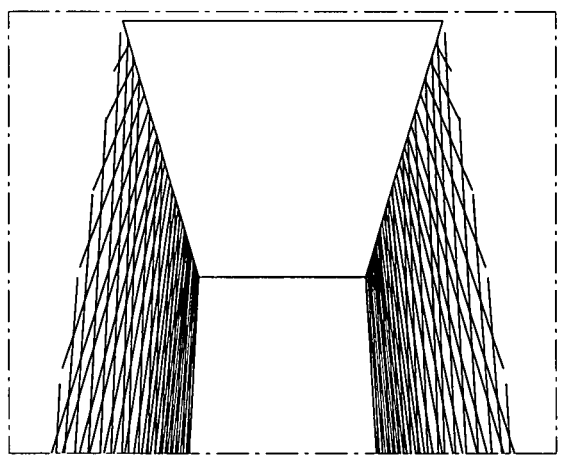

In FIG. 20, remove lid and apply spray adhesive to a 1" perimeter around expanded metal edges.

Figure 21:
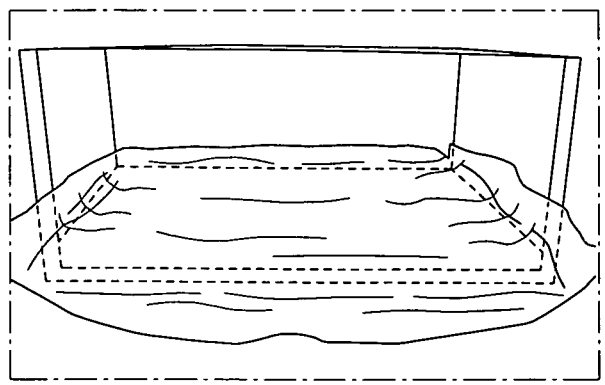

In FIG. 21, install scrim, press onto adhesive.

Figure 22:
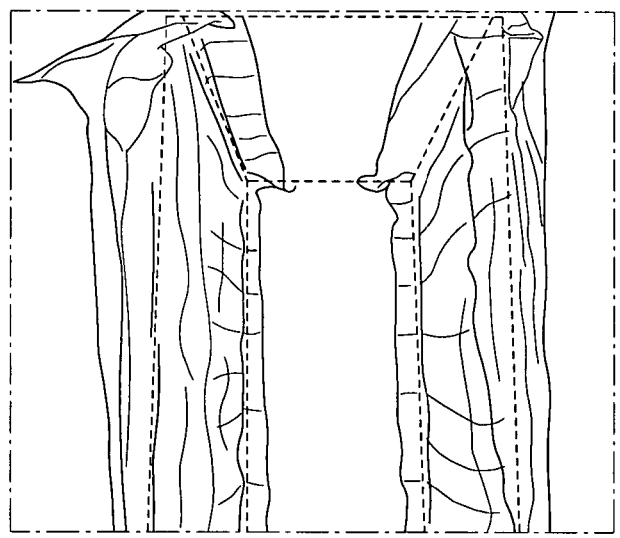

In FIG. 22, repeat for other side.

Figure 23:
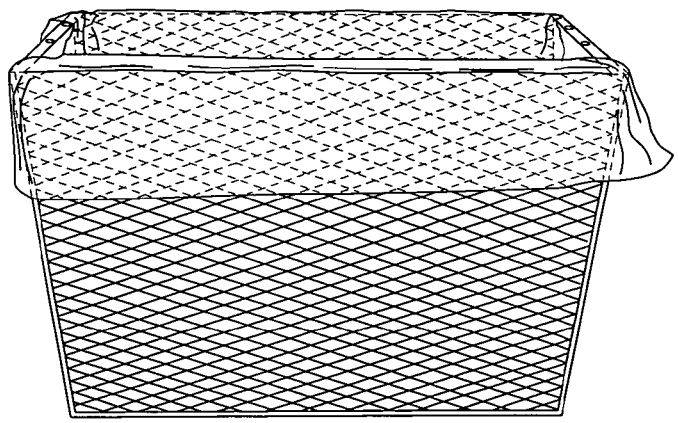

In FIG. 23, cartridge ready for loading.

Figure 24:
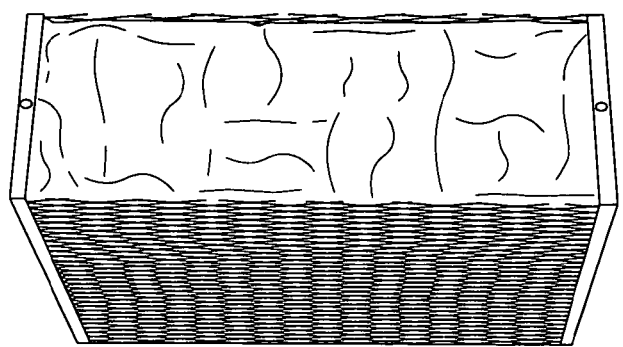

In FIG. 24, fill with soda lime media and close scrim tabs.

Figure 25:
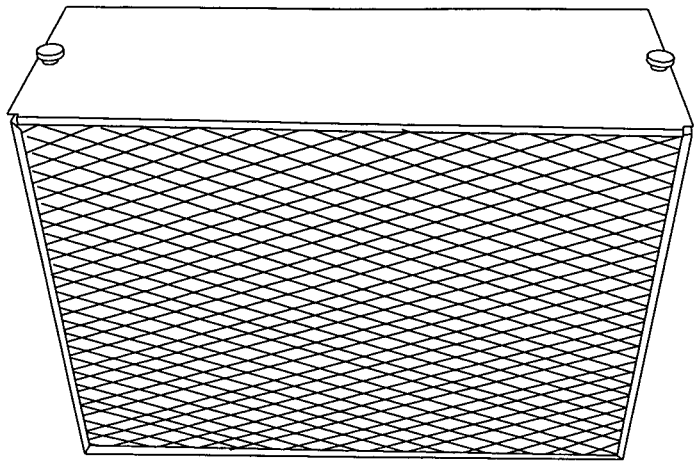

In FIG. 25, install lid with fasteners.

Figure 26:
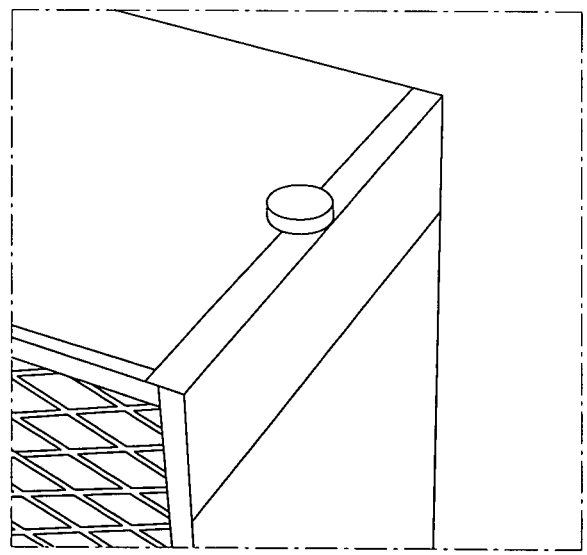

In FIG. 26, seal lid corners with tape.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. An apparatus for cleaning air comprising:
a housing having a chamber;
a carbon dioxide scrubber layer of particles of soda lime disposed in the chamber which cleans carbon dioxide from air passing through the scrubber layer, the layer having a plurality of cartridges having the particles of soda lime, each cartridge having a cartridge housing having a cartridge chamber disposed within the housing, and a porous top and opposing porous bottom with the cartridge chamber disposed between the top and the bottom; and
a forcing element which draws the air into the scrubber and forces the air through the scrubber layer which is powered without any electricity, the forcing element includes a fan, the forcing element includes a fluid powered motor mechanically engaged with the fan to operate the fan which draws the air into the chamber and forces the air through the layer, the forcing element includes a valve in fluid connection with the motor through which fluid is provided to the motor to operate the motor, the valve includes a compressed air port which receives a flow of compressed air.

2. An apparatus as described in claim 1 wherein the valve includes a compressed oxygen port which receives a flow of compressed oxygen, the valve combining the compressed air flow and the compressed oxygen flow and directing it to the motor.

3. An apparatus as described in claim 2 wherein the valve is adjustable to control the flow of compressed oxygen.

4. An apparatus as described in claim 3 wherein the valve uses only fluid to operate.

5. An apparatus as described in claim 4 wherein the fan is attached to a side wall of the housing at a hole in the side wall.

6. An apparatus as described in claim 5 wherein the motor has an outlet port through which the compressed air and compressed oxygen flows into the chamber after flowing through the motor to operate the motor.

7. An apparatus as described in claim 6 wherein the housing has a top with an opening through which the air that has passed through the layer flows out of the housing.

8. An apparatus as described in claim 7 wherein the opening of the housing has a screen.

9. An apparatus as described in claim 8 wherein the scrubber layer includes a platform disposed in the chamber upon which the soda lime is disposed.

10. A method for cleaning carbon dioxide from air comprising the steps of:
flowing compressed air and compressed oxygen through a fluid driven motor to operate the motor without any electricity, the flowing step includes the step of connecting a compressed air tank to a compressed air line connected to a valve connected to the motor;
rotating a fan with the operating motor; and
drawing air into a chamber of a housing with the fan blowing the air through a carbon dioxide scrubber layer of particles of soda lime in the chamber, which scrubs the air of carbon dioxide, and out through an opening in the chamber above the layer.

11. A method as described in claim 10 including the step of flowing the compressed air and compressed oxygen into the chamber after it flows through the motor to operate the motor.

12. A method as described in claim 11 wherein the flowing step includes the step of connecting a compressed oxygen tank to a compressed oxygen line connected to the valve connected to a gas line to the motor.

13. A method as described in claim 12 wherein the flowing step includes the step of combining the compressed air from the compressed air line and the compressed oxygen from the compressed oxygen line together with the valve and providing the compressed air and the compressed oxygen together to the motor.

14. A method as described in claim 13 including the step of placing the housing into an enclosure.

15. An apparatus for cleaning air, comprising:
a housing, the housing defining a chamber;
a scrubber layer disposed within the chamber, the scrubber layer containing particles of a $CO_2$ scrubbing material; and
a forcing element which draws ambient air through the housing into the chamber and forces the air through the scrubber layer within the chamber, wherein the forcing element comprises a fan that is driven by a motor powered by a combined flow of compressed air and compressed oxygen.

16. The apparatus of claim 15, wherein the forcing element further comprises a valve that combines a flow of compressed air and a flow of compressed oxygen.

17. The apparatus of claim 16, wherein the valve is capable of combining the flow of compressed air and the flow of compressed oxygen in variable ratios.

18. The apparatus of claim 17, wherein the rate of flow of compressed oxygen is user-adjustable and the rate of flow of compressed air is fixed.

19. The apparatus of any one of claims 15-18, wherein the forcing element further comprises an outlet port through which the combined flow of compressed air and compressed oxygen exits the forcing element after powering the fan motor.

20. The apparatus of claim 19, wherein the outlet port is positioned to allow the combined flow of compressed air and compressed oxygen that exits the forcing element to mix with air within the chamber before the air is forced through the scrubber layer.

21. The apparatus of any one of claims 15-18, wherein the particles of $CO_2$ scrubbing material are disposed within one or more cartridges.

22. The apparatus of claim 19, wherein the particles of $CO_2$ scrubbing material are disposed within one or more cartridges.

23. The apparatus of claim 20, wherein the particles of $CO_2$ scrubbing material are disposed within one or more cartridges.

24. The apparatus of any one of claims 15-18, wherein the $CO_2$ scrubbing material is soda lime.

25. The apparatus of claim 19, wherein the $CO_2$ scrubbing material is soda lime.

26. The apparatus of claim 20, wherein the $CO_2$ scrubbing material is soda lime.

27. The apparatus of claim 21, wherein the $CO_2$ scrubbing material is soda lime.

28. The apparatus of claim 22, wherein the $CO_2$ scrubbing material is soda lime.

29. The apparatus of claim 23, wherein the $CO_2$ scrubbing material is soda lime.

* * * * *